US005802164A

United States Patent [19]
Clancy et al.

[11] Patent Number: 5,802,164
[45] Date of Patent: Sep. 1, 1998

[54] SYSTEMS AND METHODS FOR CONTROLLING TELEPHONE SOUND ENHANCEMENT ON A PER CALL BASIS

[75] Inventors: Beth J. Clancy, Westfield, N.J.; Richard L. Else, Glen Ellyn, Ill.; Richard E. Le Cronier, New Monmouth; Dario L. Parola, Matawan, both of N.J.; Roger E. Stone, Naperville, Ill.; Nancy Y. Tai, Middletown, N.J.

[73] Assignee: AT&T Corp, Middletown, N.J.

[21] Appl. No.: 575,789

[22] Filed: Dec. 22, 1995

[51] Int. Cl.⁶ .............................. H04M 1/00; H04M 3/00; H04M 7/00; H04M 9/00
[52] U.S. Cl. ........................ 379/347; 379/127; 379/220; 379/338; 379/343; 379/400; 379/414; 381/102; 381/103; 704/205
[58] Field of Search ........................ 379/347, 395, 379/340, 343, 400, 401, 406, 409, 410, 411, 414, 415, 416, 417, 418, 419, 346, 127, 219, 220, 338; 381/98, 101, 102, 103; 704/205

[56] References Cited

U.S. PATENT DOCUMENTS

| | | |
|---|---|---|
| 2,350,951 | 6/1944 | Zinn . |
| 3,114,005 | 12/1963 | Kuhn . |
| 3,183,313 | 5/1965 | Cutler . |
| 3,306,982 | 2/1967 | Ericsson . |
| 3,397,402 | 8/1968 | Schneider . |
| 3,414,688 | 12/1968 | Hermes et al. . |
| 3,706,862 | 12/1972 | Chambers, Jr. ............. 379/347 X |
| 3,781,481 | 12/1973 | Shaffer et al. ............. 379/299 |
| 3,784,756 | 1/1974 | Nemchik ............. 379/400 |
| 3,818,151 | 6/1974 | Chambers, Jr. et al. ............. 379/347 |
| 3,911,370 | 10/1975 | Pace ............. 330/21 |
| 4,054,941 | 10/1977 | Shichman ............. 379/400 |
| 4,056,688 | 11/1977 | Stiefel ............. 379/296 |
| 4,132,863 | 1/1979 | Smith ............. 379/400 |
| 4,277,655 | 7/1981 | Surprenant ............. 379/340 |
| 4,315,107 | 2/1982 | Ciesielka et al. ............. 379/400 |
| 4,320,257 | 3/1982 | Warman ............. 379/202 |
| 4,490,843 | 12/1984 | Bose et al. ............. 381/102 |
| 4,535,445 | 8/1985 | Lahe et al. ............. 370/268 |
| 4,638,298 | 1/1987 | Spiro ............. 340/827 |
| 4,665,383 | 5/1987 | Desjardins ............. 340/506 |
| 4,809,338 | 2/1989 | House ............. 381/103 |
| 4,811,334 | 3/1989 | Matt ............. 370/259 |
| 4,882,749 | 11/1989 | Zuk ............. 379/346 |
| 5,195,132 | 3/1993 | Bowker et al. ............. 379/410 |
| 5,206,902 | 4/1993 | Bowker ............. 379/220 |
| 5,388,185 | 2/1995 | Terry et al. ............. 379/346 X |
| 5,471,527 | 11/1995 | Ho et al. ............. 379/347 |
| 5,521,919 | 5/1996 | Anderson et al. ............. 379/347 X |
| 5,539,806 | 7/1996 | Allen et al. ............. 379/347 X |

*Primary Examiner*—Harry S. Hong

[57] ABSTRACT

In a communications system containing signal enhancement circuitry capable of selectively enhancing portions of a plurality of signals carried on a corresponding plurality of channels through the signal enhancement circuitry, a system and method for controlling enhancement on a per call basis. The system includes: (1) command generation circuitry for generating an enhancement command for transmission to the signal enhancement circuitry and (2) command reception circuitry, associated with the signal enhancement circuitry, for receiving the enhancement command from the command generation circuitry and selectively enhancing the portion of the signals on the per call basis according to the enhancement command.

23 Claims, 3 Drawing Sheets

SYSTEMS AND METHODS FOR CONTROLLING TELEPHONE SOUND ENHANCEMENT ON A PER CALL BASIS

TECHNICAL FIELD OF THE INVENTION

The present invention is directed, in general, to communications systems and networks and, more specifically, to systems and methods for controlling telephone sound enhancement on a per call basis.

BACKGROUND OF THE INVENTION

Communications systems establish communications links between calling and called stations. Once a particular link is established, the calling and called stations begin to exchange signals, such as voice or data signals ("telephone sounds"). Contemporary communications systems include both telephone networks and computer networks. Until recently, such communication systems have traditionally been wired systems, however, wireless communication systems (e.g., wireless telephony, message paging, etc.) are becoming increasingly popular.

The effectiveness of any telephone network (or, more generally, any communications system) to communicate information among various stations is related to the particular system's ability to overcome two primary obstacles, namely interference and noise. "Interference" is a disturbance that occurs when a desired signal and one or more interfering signals are received concurrently. The interference brought about by reception of multiple signals causes the desired signal to be incorrectly received. In contrast, "noise" is a disturbance that is caused by sources other than an interfering signal, and may manifest itself as static. Interference or noise may partially, or even completely, distort or garble the information content of the desired signal.

Communications research has found that most of the energy in noise resides in a low frequency range (within a so-called "baseband" of frequencies below 300 Hertz). A prior art approach taken to address noise has been to attenuate that portion of a signal lying within the baseband. In fact, Electronic Industries Association ("EIA") standard RS-470, published in January, 1981, and governing the design of telephone instruments, recommends signal attenuation below 300 Hertz. Most telephone instruments currently in use attenuate the baseband in accordance with RS-470. However, it has been found that attenuation of the baseband portion of a signal degrades the quality of the signal as a whole.

To compensate for undesirable baseband attenuation and the concomitant signal degradation caused thereby, signal quality may be restored at the telephone network level by selectively amplifying portions of the baseband (e.g., 100 through 300 Hertz) originally attenuated by RS-470 compliant telephone instruments. The reasoning is that, although selective enhancement may also reintroduce some noise into the overall signal, the increase in signal quality brought about by virtue of the enhancement will more than compensate for any added noise. This solution (known commercially as TRUEVOICE®-type services) is disclosed in detail in U.S. Pat. No. 5,195,132 (the "'132 patent"), issued on Dec. 3, 1990, entitled "Telephone Network Speech Signal Enhancement," commonly assigned with the present invention and incorporated herein by reference. In one embodiment disclosed therein, the selective enhancement is adaptive, that is, enhancement occurs as a function of the signal content over a given period of time and therefore constantly changes. However, the quality of a selectively-enhanced signal may be degraded if it is subjected to repeated enhancement. If the baseband of a signal is repeatedly increased, the level of the baseband relative to the remainder of the signal will become disproportionately high and therefore distorted.

To address the problem of repeated enhancement, a limit may be placed on the number of times a signal may be enhanced. This solution is disclosed in detail in U.S. Pat. No. 5,206,902 (the "'902 patent"), issued on Apr. 27, 1993, entitled "Network Signaling Arrangement for Controlling Tandem Network Functions," also commonly assigned with the present invention and incorporated herein by reference. The mechanism to determine whether repeated enhancements are active, however, depends on the presence of speech signals for a time period while in a repeated enhancement mode. Consequently, the speech signals that are present during that time period are distorted. What is needed in the art is a system and method for determining if repeated telephone sound enhancements would be applied to a signal, prior to the speech signals first presence, thereby eliminating the initial signal distortion. Further, there is a need in the art for a system and method for controlling enhancement on a per call basis, as enhancement may be appropriate for one calling signal processed by particular enhancement circuitry, but not for another.

SUMMARY OF THE INVENTION

To address the above-discussed deficiencies of the prior art, the present invention provides, in a communications system containing signal enhancement circuitry capable of selectively enhancing at least portions of a plurality of signals carried on a corresponding plurality of channels through the signal enhancement circuitry, a system and method of operation of the communications system for controlling enhancement on a per call basis. The system includes: (1) command generation circuitry for generating an enhancement command for transmission to the signal enhancement circuitry and (2) command reception circuitry, associated with the signal enhancement circuitry, for receiving the enhancement command from the command generation circuitry and selectively enhancing the portion of the signals on the per call basis according to the enhancement command.

The present invention therefore introduces the ability to control enhancement by the signal enhancement circuitry on a call-by-call basis. For certain international calls or calls wherein one or more of the parties involved have elected to forego enhancement, this is an appropriate solution. In an advantageous embodiment of the present invention, the enhancement command is capable of disabling the enhancing of one of the plurality of signals on a corresponding one of the plurality of channels. In another advantageous embodiment, the enhancement command is capable of disabling the enhancing of the one of the plurality of signals on the corresponding one of the plurality of channels as a function of a selected one of an automatic number identification ("ANI") number or a dialed number ("DN"). Therefore, a single enhancement command may be adapted to control multiple channels. In an embodiment to be described, one enhancement command may control up to 5 channels. ANI number and DN allow enhancement to be deactivated for parties specifically desiring such.

In another advantageous embodiment of the present invention, the signal enhancement circuitry contains automatic volume control ("AVC") circuitry for adaptively adjusting the enhancing as a function of a content of the plurality of signals carried on the corresponding plurality of channels. In another advantageous embodiment, the enhancement command resets the AVC circuitry to reset the adjusting of the enhancing. In adaptive enhancement, the selectivity or degree of enhancement is a function of the content of the signal being enhanced (analogous to automatic gain control ("AGC")). Transient conditions may skew enhancement undesirably. The present invention provides a control mechanism by which enhancement may be reset to nullify the undesired skewing.

In another advantageous embodiment of the present invention, the enhancement command contains call boundary data for indicating when a call is initiated and terminated. Therefore, enhancement appropriate to one call is preferably not forced upon a subsequent call. The call boundary data allows enhancement to be reset for each call.

In a further advantageous embodiment of the present invention, the signal enhancement circuitry further responds to a tandem control signal for disabling enhancing. The tandem control signal, a product of TRUEVOICE®-type services and products, as described in the '902 patent, is embodied in a preferred 25 Hertz in-band tone. The tandem control signal allows multiple enhancement to be defeated. The present invention allows this function to continue. In a still further advantageous embodiment of the present invention, the command generation circuitry is associated with a network element, such as a switch, and the command generation circuitry is further operative to determine whether the associated network element is an end network element. The command generation circuitry, in response to this determination, is operative to disable tandem control signal generation and enhancement, thereby eliminating any initial speech distortion due to repeated enhancements. This may suitably be associated with the call boundary data.

One embodiment for using and/or distributing the present invention is as software. The software embodiment includes a plurality of processing instructions which are stored on a conventional storage medium. The instructions are readable and executable by one or more processing systems having one or more processing circuits. The instructions, upon execution, operate to selectively enhance communication signals on a per-call basis. Exemplary storage media include without limitation magnetic, optical, and semiconductor, as well as suitably arranged combinations thereof.

The foregoing has outlined, rather broadly, exemplary features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which like numbers designate like parts, and in which.

DETAILED DESCRIPTION

Figure 1:
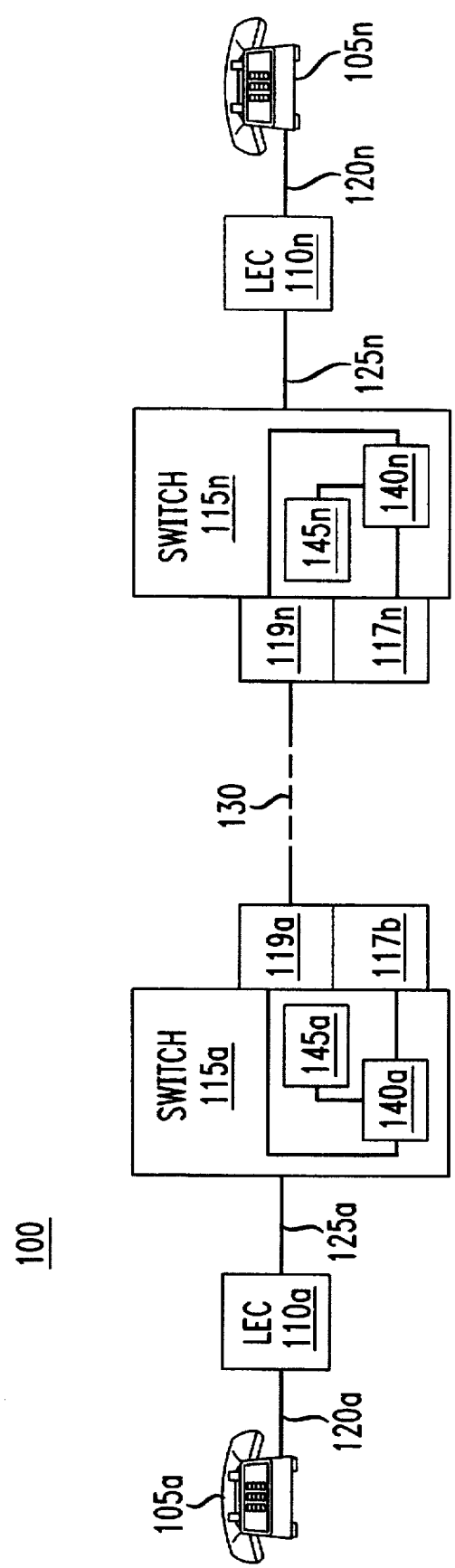
FIG. 1 illustrates a high-level block diagram of an exemplary communications system for processing telephony signals in accordance with the principles of the present invention.

Referring initially to FIG. 1, illustrated is a high-level block diagram of an exemplary communications system 100 for processing telephony signals in accordance with the principles of the present invention. A "signal," as the term is used herein, includes a data packet, a data frame, a message, a sequence of data or any other variation of a physical quantity that may be used to convey information. Communications system 100 illustratively includes a plurality of network elements, namely, two conventional telephone stations 105a, 105n, two exemplary local exchange carriers ("LEC") 110a, 110n, and two exemplary switches 115a, 115n. The network elements are suitably associated with (i.e., contains, is connected to, is coupled to, is communicable with, juxtaposes, cooperates with, etc.) one another by a plurality of conventional communication links, 120a, 120n, 125a, 125n, 130. "Includes," as the terms is used herein, means to include without limitation and "or," as the term is used herein, means and/or.

In the illustrated embodiment, each of exemplary switches 115a and 115n is associated with an exemplary communications device 117a and 117n, respectively. Each of exemplary communications devices 117a and 117n may suitably be associated with signal enhancement circuitry 119a and 119n, respectively. Exemplary signal enhancement circuitry 119 is capable of enhancing at least portions of a plurality of signals carried on a corresponding plurality of channels therethrough, and more particularly, is controllable on a per call basis in accordance with the principles of the present invention. The cooperative functionality of communications devices 117a, 117n and signal enhancement circuitry 119a, 119n is described in greater detail with reference to FIG. 3.

In an exemplary embodiment, each of switches 115 is an AT&T 4ESS switch, although in alternate embodiments, any of switches 115 may be any conventional, suitably arranged switch.

AT&T 4ESS switches 115 are known in the industry, and are commonly referred to as "intelligent switches," because each is respectively associated with processing circuitry 140a and 140n. Exemplary processing circuitry 140 may suitably be implemented, programmed or fabricated to perform ones of a plurality functions or operations within communications system 100. In the present embodiment, both processing circuitry 140a and 140n are respectively associated with suitable conventional memories 145a and 145n.

Assume, for illustrative purposes, the following calling scenario. Calling telephone station 105a initiates, or places, a telephone call to telephone 105n, thereby causing communication of a corresponding telephony, or calling, signal from telephone station 105a to LEC 110a via communications link 120a. The signal is communicated from LEC 110a to switch 115a via conventional communications link 125a. Switch 115a is termed an "originating access switch," because it is the first switch in communications system 100 following the LEC 110a. LEC 110a may suitably provide a set of data records to switch 115a that may suitably include the telephone number of calling telephone station 105a or called telephone station 105n. The telephone number of calling and called telephone stations 105a and 105n are commonly referred to as an automatic number identification ("ANI") number and a dialed number ("DN"), respectively. The telephony signal is then communicated from switch 115a, via signal enhancement circuitry 119a, to switch 115n, via signal enhancement circuitry 119n, from switch 115n to LEC 110n, and from LEC 110n to called telephone station 105n via communication links 130, 125n, 120n, respectively.

Although only two switches 115 are shown, a calling signal transmitted through network 100 may transmit through other additional switches 115, as well as other network elements for that matter. "Network elements," as the phrase is used herein, includes, in addition to the network elements defined hereinabove (e.g., telephone stations 105, LECs 110 and switches 115), gateways, bridges, routers, portal devices, network nodes and the like, all of which are known. A "network node," as the phrase is used herein, includes any junction, end or connection point, apparatus, station, terminal or the like, whether portable or not, that is capable of communicating signals, or information, in a communication system.

Figure 2:
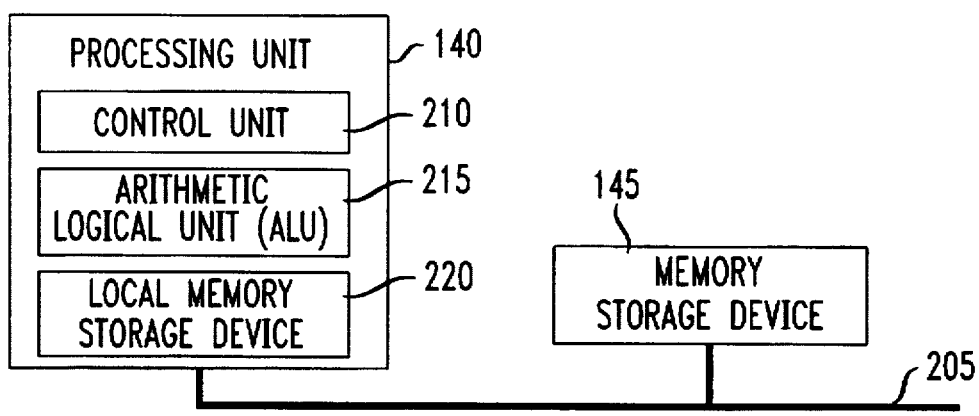
FIG. 2 illustrates a block diagram of an exemplary microprocessing circuit that may suitably be associated with any of the exemplary switches of FIG. 1.

Turning now to FIG. 2, illustrated is a block diagram of an exemplary microprocessing circuit 200 that may suitably be associated with switches 115 of FIG. 1. Microprocessing circuit 200 includes processing circuitry 140 coupled via data bus 205 with detached local memory 145. Conventional memory 145 is operative to store data or tasks, which processing circuitry 140 is operative to retrieve and process. Exemplary processing circuit 140 includes a control unit 210, an arithmetic and logic unit ("ALU") 215, and an internal memory 220 (e.g., stackable cache, a plurality of registers, etc.). Control unit 210 is suitably operative to fetch ones of the instructions from memory 145. ALU 215 is suitably operative to perform a plurality of arithmetic or logic operations, such as addition or Boolean AND, for example, needed to carry out those instructions. Internal memory 220 is suitably operative to provide local high speed storage used to store temporary results and control information.

In accordance with the illustrated embodiment, and with reference to communications system 100 of FIG. 1, memory 145 is operative to store a plurality of tasks, including a signal enhancement task. Processing circuitry 140 is operative to retrieve and execute the signal enhancement task to control processing of telephony signals, including, for example, the calling signal communicated between calling and called telephone stations 105a and 105n, respectively, as described hereinabove. The executed signal enhancement task directs processing circuitry 140a to generate an enhancement command for transmission to signal enhancement circuitry 119a, which in the illustrated embodiment is associated with communications device 117a. Signal enhancement circuitry 119a is operative to receive the enhancement command from processing circuitry 140a and to selectively enhance the telephony signal on the per call basis according to the enhancement command.

Processing circuitry 140a, in performing the foregoing, is operative to determine optimally when telephone sound enhancement should or should not be applied to a particular telephony signal, or possibly a group of signals. This aspect of switch 115 and microprocessing circuit 200 enables or allows signal enhancement to be tailored to each call (e.g., call-by-call basis, etc.) or group of calls. In an advantageous embodiment, processing circuitry 140 is operative to identify for each signal at least one of an automatic number identification ("ANI") number or a dialed number ("DN"). The ANI number or the DN may suitably be associated with the signal, a feature that is well known. Processing circuitry 140a may suitably be operable, as a function of the identified ANI number or DN, to generate the enhancement command.

In a further advantageous embodiment, signal enhancement circuitry 119 may suitably be responsive to, or operative to, generate a tandem control signal for disabling enhancing. The tandem control signal, described in the '902 patent, is embodied in an in-band tone, allowing multiple enhancement to be defeated in accordance therewith. The present embodiment, while allowing this function to continue, improves upon the same. More particularly, processing circuitry 140 may suitably be further operative to determine whether switch 115 is an "end" network element within the communication path of the telephony signal through communication system 100. Processing circuitry 140, in response to this determination, is operative to generate an out-of-band signal to disable certain tandem control signal generation and enhancement by signal enhancement circuitry 119.

Figure 3:
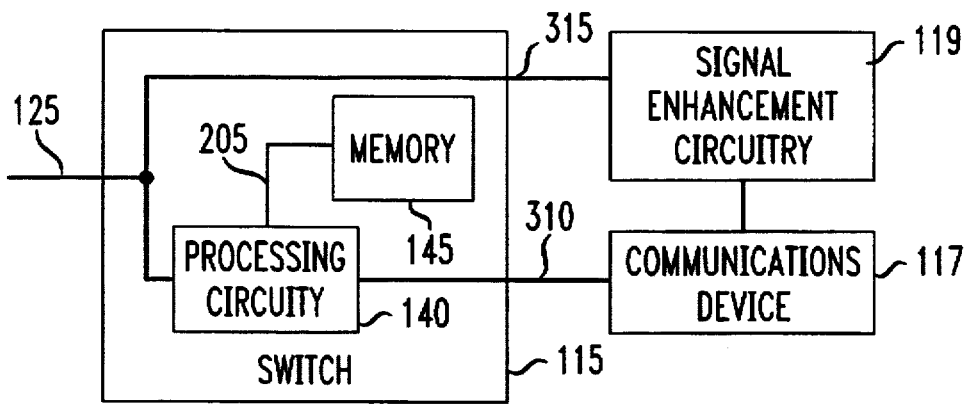
FIG. 3 illustrates a block diagram of exemplary control circuitry for controlling telephony signal enhancement on a per-call basis in accordance with the principles of the present invention.

Turning now to FIG. 3, illustrated is a block diagram of an exemplary system for controlling telephony signal enhancement on a per-call basis in accordance with the principles of the present invention. Exemplary processing circuitry 140 and memory 145 of switch 115 are suitably associated with communications device 117 via conventional communications link 305. Exemplary communications device 117 is suitably associated with signal enhancement circuitry 119 via a conventional communications link 310. In an advantageous embodiment, signal enhancement circuitry 119 may suitably include an echo canceller and other conventional means for enhancing signals, in particular the enhancing signal means in accordance with the '132 and '902 patents. In a further advantageous embodiment, the echo canceller is a Universal Services Echo Canceller ("USEC") having a USEC Frame with seven shelves, all of which are known.

In accordance with the illustrative embodiment, processing circuitry 140 provides command generation circuitry for generating an enhancement command for transmission to signal enhancement circuitry 119. The enhancement command is transmitted to signal enhancement circuitry 119 via communication link 305, communications device 117 and communications link 310. Exemplary Communications device 117 suitably functions as a gateway for communicating signals therethrough. Signal enhancement circuitry 119 includes command reception circuitry which receives the enhancement command from processing circuitry 140 and, in response thereto, selectively enhances an associated telephony signal traversing switch 115 and signal enhancement circuitry 119 on the per call basis via conventional communications link 315.

The illustrated system controls enhancement by the signal enhancement circuitry 119 on a call-by-call basis. This aspect of the exemplary embodiment is particularly advantageous for certain international calls or calls wherein one or more of the parties involved have elected to forego enhancement. In a further advantageous embodiment, the enhancement command is capable of disabling the enhancing of at least one of a plurality of signals, possibly as a function of a selected one of an ANI or a DN associated with the telephony signal. The ANI number or the DN may suitably be used to access stored information associated with one of the called or calling parties relating to preferences regarding telephony signal enhancement. The techniques for associating the ANI number and the DN with stored information are known.

In another advantageous embodiment, signal enhancement circuitry 119 contains automatic volume control ("AVC") circuitry. AVC circuitry is known and is operative to adaptively adjust signal enhancing as a function of a content of one or more of a plurality of signals carried on a corresponding plurality of channels, such as described in the '132 patent. A suitable enhancement command may be generated by processing circuitry 140 to reset the AVC circuitry to reset the adjusting of the enhancing. In adaptive enhancement, the selectivity or degree of enhancement is a function of the content of the signal being enhanced (analogous to automatic gain control ("AGC")). The present invention provides a control mechanism by which enhancement may be reset to nullify the undesired skewing caused by transient conditions.

Processing circuitry 140, communications device 117 and enhancement circuitry 119 are distally associated for illustrative purposes only, in point of fact, the functionality of the same may suitably be implemented within a single circuit, multiple circuits or separate devices. In general, the transmission, or routing, of communications signals among ones of a plurality of network elements is known in the art, and alternate approaches, arrangements, configurations or implementations may suitably be employed to transmit a calling signal between network elements without departing from the spirit and scope of the present invention. Conventional data communications is more fully discussed in *Data Communications Principles*, by R. D. Gitlin, J. F. Hayes and S. B. Weinstein, Plenum Press (1992), and in *The Irwin Handbook of Telecommunications*, by James Harry Green, Irwin Professional Publishing (2nd ed. 1992), both of which are incorporated herein by reference.

In alternate embodiments, microprocessing circuit 200, processing circuitry 140, communications device 117 or signal enhancement circuitry 119, may be replaced by or combined with any other suitable processing circuitry, including programmable logic devices, such as programmable array logic ("PALs") or programmable logic arrays ("PLAs"), digital signal processors ("DSPs"), field programmable gate arrays ("FPGAs"), application specific integrated circuits ("ASICs"), very large scale integrated circuits ("VLSIs") or the like. Conventional processing circuitry design is more fully discussed in *The Art of Electronics*, by Paul Horowitz and Winfield Hill, Cambridge University Press (2nd ed. 1989); conventional processing system design is more fully discussed in *Computer Organization and Architecture*, by William Stallings, MacMillan Publishing Co. (3rd ed. 1993); and conventional processing system network design is more fully discussed in *Data Network Design*, by Darren L. Spohn, McGraw-Hill, Inc. (1993), each of which is incorporated herein by reference.

In accordance with the illustrated embodiment, there are at least two advantageous signal types transmitted through communications system 100, and more particularly between processing circuitry 140, communications device 117 and enhancement circuitry 119. A first signal-type may suitably originate from processing circuitry 140 and includes data addressed to signal enhancement circuitry 119. A portion of the same is used to control individual channels within signal enhancement circuitry 119 and, more particularly, for identifying occurrence of an end of signal (i.e., call boundary information etc.), requesting certain signal processing (e.g., echo cancellation, etc.) or the like. In accordance with the illustrated embodiment, the first-type of signal may suitably control between one and five channels. A second signal-type, commonly referred to as a "heartbeat message," is used to verify that communications link 310 is functional and to provide status information or data about messages received at signal enhancement circuitry 119. In an advantageous embodiment, signal enhancement circuitry 119 is operative to transmit a responsive, or acknowledgment, signal to switch 115 via communication links 310 and 305, sequentially.

Figure 4A:
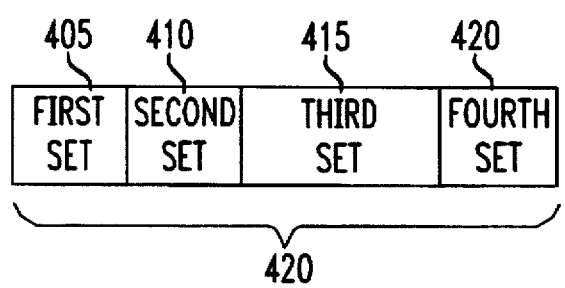
FIG. 4a illustrates a block diagram of an exemplary configuration of a control signal in accordance with the illustrated embodiment of FIGS. 1 to 3.

Turning to FIG. 4a, illustrated is a block diagram of an exemplary configuration of a first-type of signal 400 in accordance with the illustrated embodiment. First signal 400 is suitably divided into four sets. A first set 405 is one byte long and functions as a header for first signal 400. In an advantageous embodiment, first set 405 is all ones (e.g., "11111111") and no other single byte within first signal 400 may suitably include all ones. The header is used to identify the beginning of first signal 400. A second set 410 is advantageously one byte long and functions as an identifier, identifying the signal as a first type of signal, as opposed to a second type of signal (described with reference to FIG. 4b). A third set 415 is advantageously 10 bytes long and includes control data. A fourth set 420 is advantageously one byte long, wherein the first six most significant bits contain a 6 bit cyclic redundancy code ("CRC 6") value and the last two bits are set to zero to suitably enable a check or confirmation of the uniqueness of the all ones header of the next signal, if any. Use of cyclic redundancy codes are known.

The third set 415 may suitably include up to five two-byte commands, wherein any two-byte command does not include all zeros, although it is possible for one of the two command bytes to be all zero. Each two-byte command may suitably be used to control a channel, i.e., each first-type of signal 400 may control up to five channels. In alternate embodiments, third set 415 may suitably include a greater or lesser number of commands to control a corresponding number of channels. The first three most significant bits of the first byte advantageously provide signal enhancement circuitry 119 shelf number, the next three most significant bits of the first byte advantageously provide a digroup number, and the two least significant bits of the first byte and first three most significant bits of the second byte advantageously provide a channel number of the channel with which this command is associated. Use of digroup numbers are known.

The fourth bit of the second byte is referred to as a Start-of-Call("SOC")/End-of-Call ("EOC") bit. A fourth bit bit-value of "1," or "on," represents a SOC and a "0," or "off," represents an EOC. If the fourth bit indicates a SOC then the last three bits of the second byte are processed, otherwise an EOC has occurred. If an EOC occurs then the last three bits of the second byte are ignored and an EOC Automatic Volume Control ("AVC") is reset, this feature will be described in greater detail momentarily.

The fifth bit of the second byte is referred to as an Enhancement Off ("EO") bit, and may suitably be used to disable signal enhancement in accordance with the present invention. Switch 115 may suitably set this bit as a function, or in response to, an ANI number or DN information.

The sixth bit of the second byte may suitably be used to identify whether signal enhancement circuitry 119 is associated with an "end" switch 115, that is, switch 115 is directly associated with one of the calling party or the called party. If switch 115 is not associated with an "end" switch, the same may suitably be provisioned to 64 kb/s clear on the respective channel, thereby allowing signal enhancements, as well as echo cancellation, to be enabled only at an "end" switch. This "end" signal suitably allows switch 115 to disable enhancements in the appropriate direction on ANI numbers or DNs preferring no enhancement. The seventh bit of the second byte is referred to as a Maintenance bit that may suitably signify the start of an individual per call control ("iPCC") test on the respective channel in accordance with the principles of the present invention.

In an advantageous embodiment, the iPCC test on the channel suitably identifies a specific unnaturally occurring 25 Hertz tandem control signal (i.e., a "tag" detection pattern). Use of tandem control signals is known. If the pattern is detected, it will enable and then disable the enhancements in a pattern that may suitably serve as a "test passed" indication. In another advantageous embodiment, if the Maintenance bit is "on," then the EO bit may not also be "on," or the sixth bit of the second byte may not be "cleared." If this occurs, the same may suitably be recorded as a command error and included in the command error count of an acknowledgment signal discussed with reference to FIG. 4b.

The eighth, or least significant, bit of the second byte in the illustrated embodiment is a spare bit, and is not expected to have any particular value.

Figure 4B:
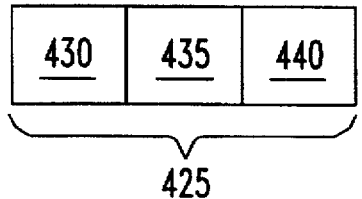
FIG. 4b illustrates a block diagram of an exemplary configuration of another control signal in accordance with the illustrated embodiment FIGS. I to 4.

Turning to FIG. 4b, illustrated is a block diagram of an exemplary configuration of the second type of signal 425 in accordance with the illustrated embodiment. In an advantageous embodiment, signal enhancement circuitry 119 may suitably receive a second signal 425 every 15 +/−3 seconds from over communications link 310. Received second signal 425, or "heartbeat message," operates to verify communications link 310 is operable. Communications link 310 will advantageously be declared failed by signal enhancement circuitry 119 if at least one error free second signal 425 is not received within three second signal cycles, which in the illustrated embodiment is approximately 45 seconds.

In an advantageous embodiment, second signal 425 includes three bytes. A first byte 430 preferably functions as a header for second signal 425. In a preferred embodiment, first byte 430 is all ones (e.g., "11111111") and no other single byte within second signal 425 may suitably include all ones. The header may suitably be used to identify the beginning of second signal 425. A second byte 435 may suitably function as an identifier, identifying second signal 425 as a second type of signal, as opposed to a first type of signal as set forth hereinabove. A third byte 440 may suitably be configure such that its first six most significant bits contain a CRC 6 value and last two bits are set to zero. The last two bits suitably indicating that a next signal is to be received and to confirm, or check, the uniqueness of the header of the next signal.

In accordance with the illustrated embodiment, signal enhancement circuitry 119 acknowledges receipt of a second type of signal, and preferably within five seconds of reception of the same from communications link 310. The acknowledgment signal may suitably provide data to monitor the performance of communications link 310. A preferred acknowledgment signal includes nine bytes. A first byte preferably functions as a header and again includes all ones (e.g., "11111111"). No other single byte within the acknowledgment signal may suitably include all ones. The header may suitably be used to identify the beginning of the acknowledgment signal. A second byte preferably functions as an identifier, identifying the acknowledgment signal. A third byte preferably includes the total number of first and second signals 400 and 425, respectively, received since the last valid second signal 425 was received. A fourth byte preferably includes the total number of errors (e.g., framing, overrun, etc.) at signal enhancement circuitry 119 since the last valid second signal 425 was received. A framing error is a received byte with an invalid stop bit, and an overrun error is a new byte received at the communications port before the previous byte is read. A fifth byte preferably includes the total number of bad signals received since the last valid second signal 425 was received, this is preferably determined by counting the number of first and second signals 400 and 425, respectively, that did not have (1) the correct number of bytes, (2) an all ones in the header byte, or (3) a correct Message Type byte, for example. A sixth byte preferably includes the total number of errored two-byte commands found in each first signal 400 since receiving the last valid second signal 425. A seventh byte and an eighth byte preferably include the total number of valid, or "good," signals received since the last valid second signal 425 was received. The seventh byte preferably contains the most significant byte and the eighth byte contains the least significant byte of the count. The first six most significant bits of the ninth byte contain a CRC 6 value and the last two bits are set to zero. The last two bits are set to zero to suitably enable a check or confirmation of the uniqueness of the all ones header of the next signal, if any.

Using the above-identified data, the performance of communications link 310 may suitably be measured. The total number of first signals 400 transmitted by communications device 117 between second signals 425 will equal the "good" signal count (e.g., seventh and eighth bytes) plus the "bad" signal count (e.g., fifth byte). Information concerning possible causes of the "bad" signal count may suitably be given by the third and fourth bytes. In addition, errors associated with the first signal commands not related to link errors are given in the sixth byte.

Figure 5:
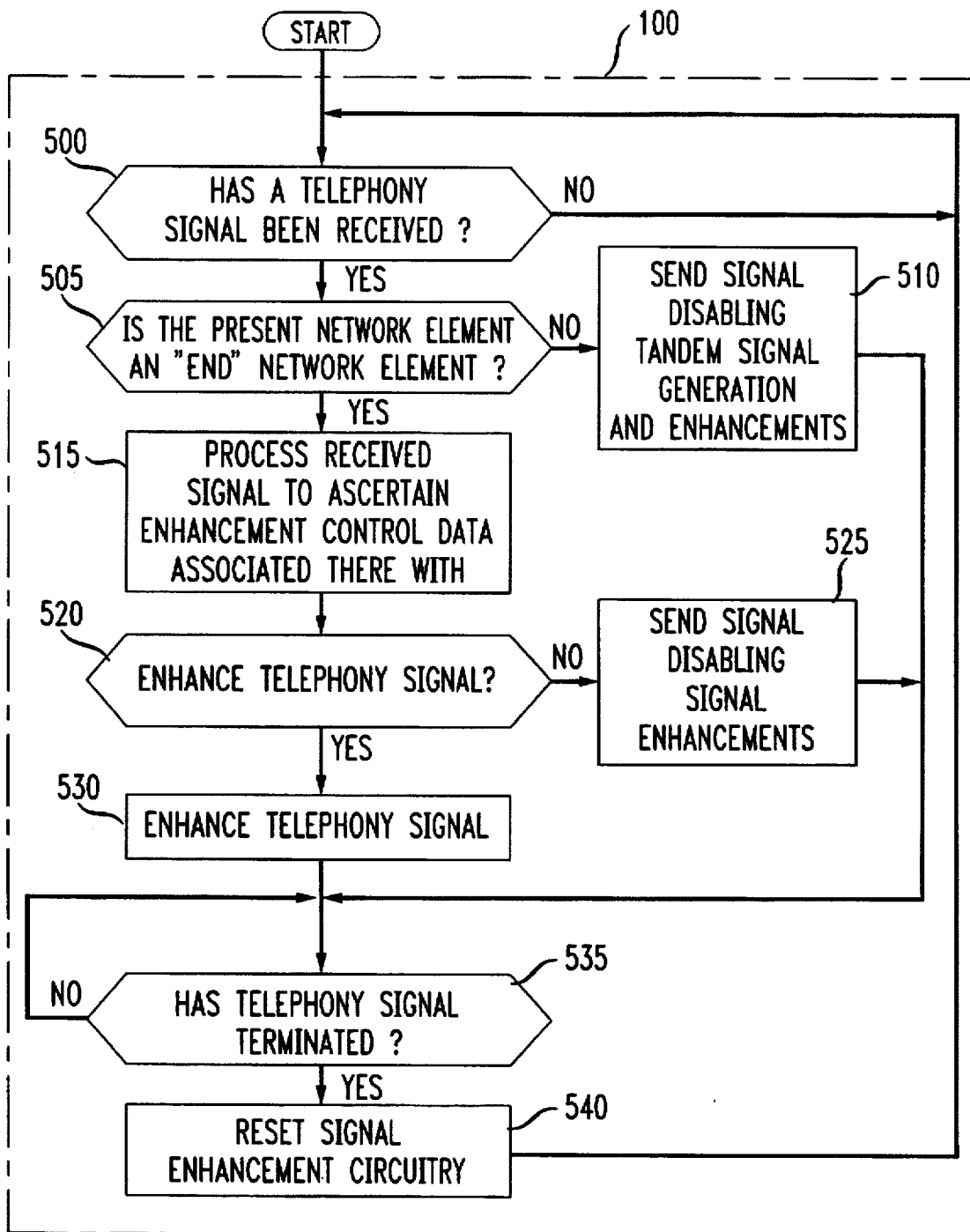
FIG. 5 illustrates a flow diagram of an exemplary method for controlling signal enhancement in a communications system containing signal enhancement circuitry in accordance with the principles of the present invention.

Turning now to FIG. 5, illustrated is a flow diagram of an exemplary method for controlling enhancement on a per call basis in a communications system containing signal enhancement circuitry in accordance with the principles of the present invention. For illustrative purposes, the discussion of FIG. 5 is undertaken with reference to FIGS. 1 to 4. The illustrative process begins upon receipt of a telephony or communications signal by switch 115a (YES branch of decisional step 500). The received signal traverses communications system 100 using one or more of a plurality of communications channels within the various elements comprising communications system 100, and in particular, switch 115a.

In an advantageous embodiment, processing circuitry 140a determines whether switch 115a is an "end" network element (decisional step 505), such as exemplary switches 115a and 115n of FIG. 1. In alternate embodiments, any number of network elements may suitably be coupled along conventional communications link 130. The techniques for determining whether a network element is an end network element are known. If switch 115a is not an end switch (NO branch decisional step 505), then processing circuitry 140a is operative to send an enhancement command to signal enhancement circuitry 119a to disable tandem signal generation (tandem signal generation being described in detail in the '902 patent), as well as signal enhancements generally (process step 510). In the illustrative embodiment, the same may suitably be provisioned to 64 kb/s clear on the respective channel, thereby allowing signal enhancements, as well as echo cancellation, to be enabled only at an "end" switch. This "end" signal suitably allows switch 115 to disable enhancements in the appropriate direction on ANI numbers or DNs preferring or requiring no enhancement. The foregoing may suitably be disabled for the remainder of the call.

If switch 115a is an end switch (YES branch of decisional step 505), then switch 115a processes the received telephony signal and in response thereto retrieves one or more data records associated with at least one of the calling or called stations, general routing information, enhancement requirements, enhancement preferences, etc. (collectively, "enhancement control data"), including, for example, an ANI number or DN associated with the same (process step 515). The techniques for defining, storing, retrieving, or maintaining the data associated directly or in directly with a calling signal are known.

Processing circuitry 140a, using the enhancement control data, determines whether the received telephony signal may suitably be enhanced (decisional step 520). If the received telephony signal may not be enhanced (NO branch decisional step 520), then processing circuitry 140a is operative to send an enhancement command to signal enhancement circuitry 119a to disable signal enhancements generally (process step 525). Again, in accordance with the illustrated embodiment, the signal enhancements may suitably be disabled for the remainder of the call. If the received telephony signal may suitably be enhanced (YES branch decisional step 520), then processing circuitry 140a is operative to generate and transmit an enhancement command to signal enhancement circuitry 119a. Signal enhancement circuitry 119a, which includes command reception circuitry or other means by which the enhancement command may be received, receives the enhancement command and selectively enhances the telephony signal in accordance with, or as a function of, the enhancement command (process step 530). Exemplary enhancements are more fully disclosed in the '132 and '902 patents.

Exemplary Switch 115a is further operative to monitor the telephony signal to ascertain call boundary data, such as the beginning or end of the telephony signal, the techniques for accomplishing the same being known. Processing circuitry 140a, in response to the call boundary data, is suitably operative to determine whether the telephony signal has terminated (decisional step 535). When the telephony signal terminates, processing circuit 140a is operative to send an enhancement command to signal enhancement circuitry 119a to reset signal enhancement circuitry 119 (process step 540). More particularly, upon termination of the telephony signal, processing circuitry 140a transmits an EOC signal, as previously defined, through communications device 117a to signal enhancement circuitry 119a. Signal enhancement circuitry 119a, in response to the EOC signal and in preparation for receipt of a next signal, may suitably reset an AVC estimation associated with signal enhancement circuitry 119a, such as to a 0 dB gain (i.e., no gain), for the channel, and then reenable the same. Once reset, signal enhancement circuitry 119a may suitably monitor ones of the communications channels through switch 115a and signal enhancement circuitry 119a to detect the presence of a tandem control signal (i.e., a tag signal at 25 Hertz in accordance with the '902 patent).

In an alternate embodiment, switch 115a or processing circuitry 140a, in response to the monitored call boundary data, may suitably prevent continuous enhancements or modifications of the telephony signal during the call. Thus, while a particular signal is traversing switch 115a, switch 115a or processing circuitry 140a may suitably use the call boundary data to preclude subsequent enhancements of the signal by signal enhancement circuitry 119a.

The exemplary process described hereinabove, may suitably be repeated at any, all or particular ones of the network elements within communications system 100. Further, in an advantageous embodiment, if while the above-described per-call enhancement or iPCC feature is enabled and communications link 310 of FIG. 3 fails, signal enhancements will preferably be provisioned "off" on all channels of signal enhancement circuitry 119 and, in a further advantageous embodiment, to the USEC frame. As previously described hereinabove, signal enhancement circuitry 119 may suitably declare communications link 310 failed if at least one valid second signal 425 is not received within three second signal cycles. In accordance with the illustrated embodiment herein described, this period may suitably begin after a first second signal 425 is received after the iPCC feature of the present invention is enabled. Communications link 310 is preferably cleared from its failed status upon receipt of a valid second signal 425 from communications device 117. Signal enhancement circuitry 119, and advantageously the USEC, may again process received first signals 400.

From the foregoing, it is apparent that the present invention provides, in a communications system containing signal enhancement circuitry 119 capable of selectively enhancing portions of a plurality of signals carried on a corresponding plurality of channels through the same, a system and method for controlling enhancement on a per call basis. The system includes: (1) command generation circuitry for generating an enhancement command for transmission to the signal enhancement circuitry and (2) command reception circuitry, associated with the signal enhancement circuitry, for receiving the enhancement command from the command generation circuitry and selectively enhancing the portion of the signals on the per call basis according to the enhancement command.

Although the present invention has been illustrated herein within the confines of a wired communications environment, the principles of the present invention may suitably be used in connection with wireless communications systems, as well as with hybrid communications systems. Illustrative communication systems include telephony systems, processing systems, message paging systems and the like. These systems may suitably selectively enhance voice or data signals, including video signals.

Although many of the aspects of the illustrated embodiment were demonstrated in conjunction with switch 115 and microprocessing circuit 200, of FIGS. 1 to 3, respectively, the same may be implemented in or associated with any suitably arranged network element. Those skilled in the art should understand that they can make various changes, substitutions and alterations herein without departing from the spirit and scope of the invention in its broadest form.

What is claimed is:

1. In a communication system having a plurality of network elements, the communication system containing signal enhancement circuitry capable of selectively enhancing a plurality of signals carried on a corresponding plurality of channels through said enhancement circuitry, a system for controlling enhancement on a per call basis, comprising:

command generation circuitry for generating an enhancement command for transmission of said signal enhancement circuitry, wherein the command generation circuitry is operative to make a determination as to whether a particular network element of the plurality of network elements is an end network element of the plurality of network elements; and command reception circuitry, associated with said signal enhancement circuitry, for receiving said enhancement command from said command generation circuitry and selectively enhancing signals based on the end network element determination on said per call basis according to said enhancement command.

2. The system as recited in claim 1 wherein said enhancement command is capable of disabling said enhancing of one of said plurality of signals on a corresponding one of said plurality of channels.

3. The system as recited in claim 2 wherein said enhancement command is capable of disabling said enhancing of said one of said plurality of signals on said corresponding one of said plurality of channels as a function of at least one of a selected one of an automatic number identification (ANI) number and a dialed number (DN).

4. The system as recited in claim 1 wherein said signal enhancement circuitry contains automatic volume control (AVC) circuitry for adaptively adjusting said enhancing as a function of a content of said plurality of signals carried on said corresponding plurality of channels.

5. The system as recited in claim 4 wherein said enhancement command resets said AVC circuitry to reset said adjusting of said enhancing.

6. The system as recited in claim 1 wherein said enhancement command contains call boundary data for indicating when a call is initiated and terminated.

7. The system in claim 1 wherein said command generation circuitry, in response to said determination, is operative to disable generation of a tandem control signal and said enhancing by said signal enhancement circuitry.

8. The system as recited in claim 1 wherein said signal enhancement circuitry further responds to a tandem control signal for disabling said enhancing.

9. In a communication system having a plurality of network elements containing signal enhancement circuitry capable of selectively enhancing a plurality of signals carried on a corresponding plurality of channels through said enhancement circuitry, a method of operation of said communication system for controlling enhancement on a per call basis, comprising:

generating an enhancement command in command generation circuitry for transmission to said signal enhancement circuitry, wherein the command generation circuitry is operative to make a determination as to whether a particular network element of the plurality of network elements is an end network element of the plurality of network elements; and receiving said enhancement circuitry into command reception circuitry associated with said signal enhancement circuitry, said command reception circuitry selectively enhancing said signals based on the end network element determination on said per call basis according to said enhancement command.

10. The method as recited in claim 9 further comprising the step of disabling said enhancing of one of said plurality of signals on a corresponding one of said plurality of channels.

11. The method as recited in claim 10 further comprising the step of disabling said enhancing of said one of said plurality of signals on said corresponding one of said plurality of channels as a function of at least one of a selected one of an automatic number identification (ANI) number and a dialed number (DN).

12. The method as recited in claim 9 wherein said signal enhancement circuitry contains automatic volume control (AVC) circuitry, said method further comprising the step of adaptively adjusting said enhancing as a function of a content of said plurality of signals carried on said corresponding plurality of channels.

13. The method as recited in claim 12 further comprising the step of resetting said AVC circuitry to reset said adjusting of said enhancing.

14. The method as recited in claim 9 wherein said enhancement command contains call boundary data for indicating when a call is initiated and terminated.

15. The method as set forth in claim 9 further including the step of disabling generation of a tandem control signal and said enhancing by said signal enhancement circuitry in response to said determination step.

16. The method as recited in claim 9 further comprising the step of responding to a tandem control signal for disabling said enhancing.

17. A communications system, comprising:

a plurality of telephone stations;

a plurality of local exchange carriers (LECs) associated with said plurality of telephone stations via a plurality of communication links;

an intelligent switch, associated with said plurality of LECs, for connecting ones of said plurality of telephone stations for communication therebetween;

signal enhancement circuitry, associated with said intelligent switch, operative to selectively enhance a plurality of signals carried on a corresponding plurality of channels through said signal enhancement circuitry; and control circuitry, associated with said intelligent switch and said signal enhancement circuitry, for controlling enhancement on a per call basis, said control circuitry operative to generate and transmit an enhancement command to said signal enhancement circuitry, said transmitted enhancement command directing said signal enhancement circuitry to selectively enhance said signals on a per call basis, wherein the control circuitry is operative to make a determination as to whether a particular network element of the plurality of network elements is an end network element of the plurality of network elements, for selectively enhancing said signals based on the end network element determination on said per call basis.

18. The communications system as recited in claim 17 wherein said enhancement command is capable of disabling said enhancing of one of said plurality of signals on a corresponding one of said plurality of channels.

19. The communications system as recited in claim 18 wherein said enhancement command is capable of disabling said enhancing of said one of said plurality of signals on said corresponding one of said plurality of channels as a function of at least one of a selected one of an automatic number identification (ANI) number and a dialed number (DN).

20. The communications system as recited in claim 17 wherein said signal enhancement circuitry contains automatic volume control (AVC) circuitry for adaptively adjusting said enhancing as a function of a content of said plurality of signals carried on said corresponding plurality of channels.

21. The communications system as recited in claim 20 wherein said enhancement command resets said AVC circuitry to reset said adjusting of said enhancing.

22. The communications system as recited in claim 17 wherein said control circuitry, in response to said determination, is operative to disable generation of a tandem control signal and said enhancing by said signal enhancement circuitry.

23. The communications system as recited in claim 17 wherein said enhancement command contains call boundary data for indicating when a call is initiated and terminated.

* * * * *